G. GUNDAKER.
CONCENTRATING TRAP.
APPLICATION FILED MAY 4, 1911.
1,005,828.
Patented Oct. 17, 1911.
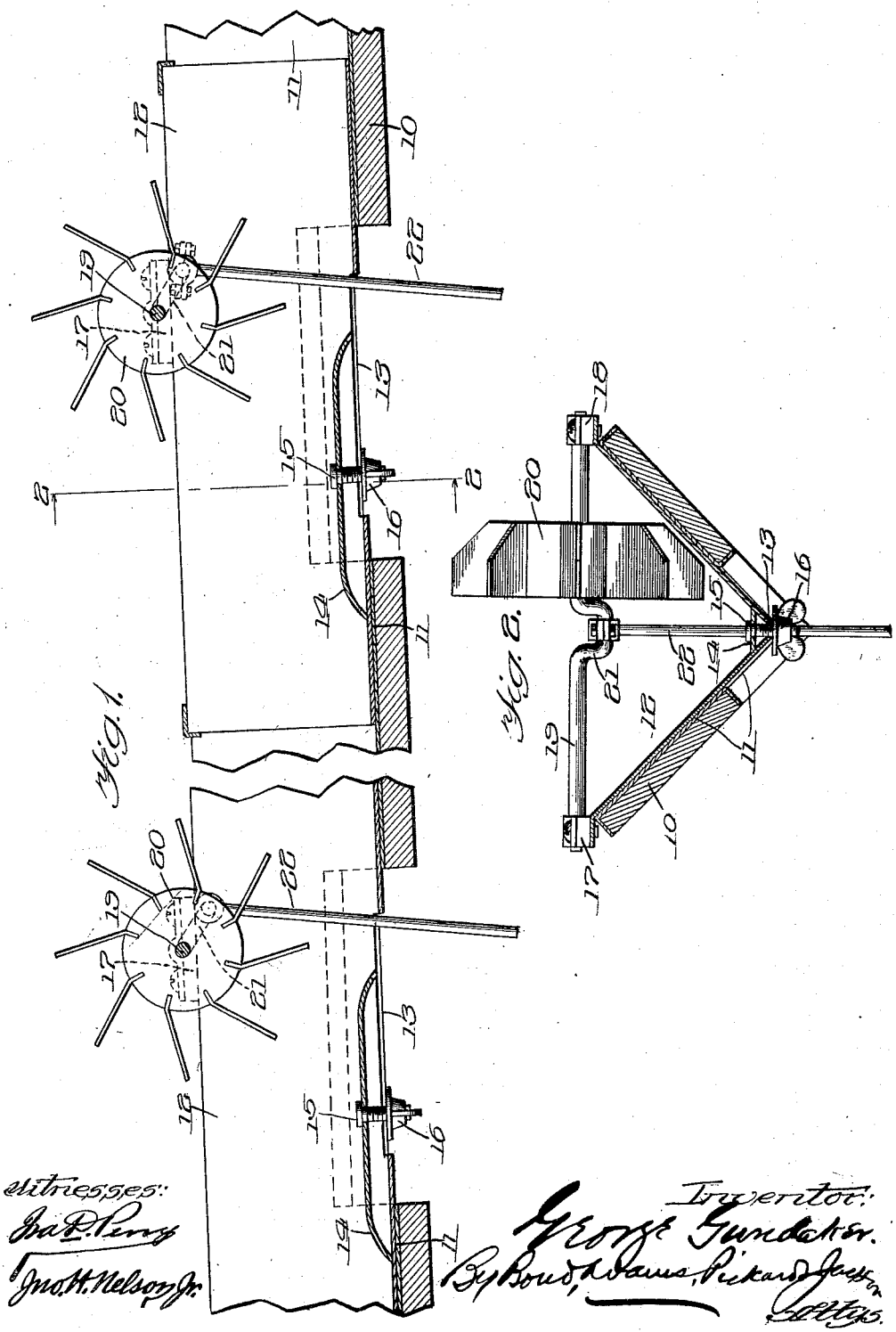

UNITED STATES PATENT OFFICE.

GEORGE GUNDAKER, OF MEADERVILLE, MONTANA, ASSIGNOR OF ONE-HALF TO HIMSELF AND ONE-HALF TO ANTONE C. GROSSO, BOTH OF MEADERVILLE, MONTANA.

CONCENTRATING-TRAP.

1,005,828. Specification of Letters Patent. Patented Oct. 17, 1911.

Application filed May 4, 1911. Serial No. 625,063.

*To all whom it may concern.*

Be it known that I, GEORGE GUNDAKER, a citizen of the United States, residing at Meaderville, county of Silverbow, State of Montana, have invented certain new and useful Improvements in Concentrating-Traps, of which the following is a specification, reference being had to the accompanying drawings.

This invention relates to ore concentrating traps of the type adapted for use in separating the valuable metal from the tailings of finely pulverized ores. For the separation of the metal from the ores, an inclined trough is used provided with a series of traps one after another along the trough. The pulverized ore is mixed thoroughly with water and washed down the trough past the traps, the valuable metal being heavier than the remainder of the ore and therefore being kept close to the bottom of the trough. When the pulp comes to the first one of the traps, the greater portion of the valuable metal is washed through the opening through the trap, the size of the opening through the trap being preferably regulated in accordance with the rate of flow of the pulp and with the richness of the ore to attain this result. It is desirable that the opening through the next succeeding trap shall be smaller since the pulp when it reaches that trap is of course leaner than at first, and in general the opening through each succeeding trap is preferably made smaller than that through the trap next above it along the trough.

It is one of the objects of this invention to provide a new and improved construction of trap by reason of which the opening through the trap may be regulated easily and quickly and locked against change.

Another object of my invention is to provide means for keeping the opening through the trap constantly open.

Another object is to improve traps of this general type in sundry details hereinafter pointed out.

The means by which I have accomplished these objects are illustrated in the accompanying drawings and are hereinafter specifically described.

That which I believe to be new is set forth in the claims.

In the drawings, Figure 1 is a side view of a portion of the trough, partly broken away, equipped with two of my improved traps, the near side of the trough and trap being cut away. Fig. 2 is a cross-section on line 2—2 of Fig. 1.

Referring to the several figures of the drawings in which corresponding parts are indicated by the same reference characters, 10 indicates a V-shaped trough provided with a tin or other metal lining 11.

12 indicates V-shaped sheet-metal traps placed at intervals along the trough 10, the trough being cut away for a short distance underneath each trap. Each of the traps 12 is also cut away along its lower edge for a portion of its length, providing a slot 13.

14 indicates a long plate, pointed at each end, overlying the slot 13, the ends of the plate being curved downward so as to fit closely the sides of the trough from end to end. 15 indicates a screw passing through a suitable opening through said plate and extending down through the slot 13.

16 indicates a thumb-nut screw-threaded on the lower end of the screw 15, by tightening which the plate 14 may be locked firmly in place at any point along the slot 13 and held securely against slipping along the slot.

17—18 indicate bearings secured on the upper edges of the trap 12 for the shaft 19.

20 indicates a water-wheel non-rotatably secured upon the shaft 19.

21 indicates a crank formed in the shaft 19, on the horizontal portion of which is pivotally mounted a rod 22 extending downward through the slot 13.

As shown in Fig. 1, the upper end of the plate 14 is notched to fit closely the rod 22 so that the plate may if desired be slid up and clamped in position to completely close the slot 13.

It will be understood that in operation the stream of water and pulp rotates the shaft 19 through the medium of the water-wheel 20, thus reciprocating the rod 22 up and down through the slot 13, thus preventing the clogging up of the slot 13 and maintaining the trap always at its highest efficiency without the necessity for the constant presence of an attendant.

What I claim as my invention and desire to secure by Letters Patent is,—

1. In combination a concentrating trap comprising a V-shaped trough provided with an opening along its lower edge, a plate pointed at each end, the ends of said plate being curved downward so as to fit closely the sides of the trough from end to end, and means adapted to tighten said plate in position against said trough at any point over said opening.

2. In combination a concentrating trap provided with an opening along its lower edge, a shaft mounted on said trap overlying said opening, a water-wheel mounted on said shaft and extending down into said trap having its paddles spaced from the bottom of said trap and adapted to be operated by the upper stratum of the stream flowing through the trap, a crank formed in said shaft, and a rod pivotally mounted on said crank and extending through said opening.

GEORGE GUNDAKER.

Witnesses:
 JOHN HOKING,
 ANTONE GIANINO.

Copies of this patent may be obtained for five cents each, by addressing the "Commissioner of Patents, Washington, D. C."